UNITED STATES PATENT OFFICE.

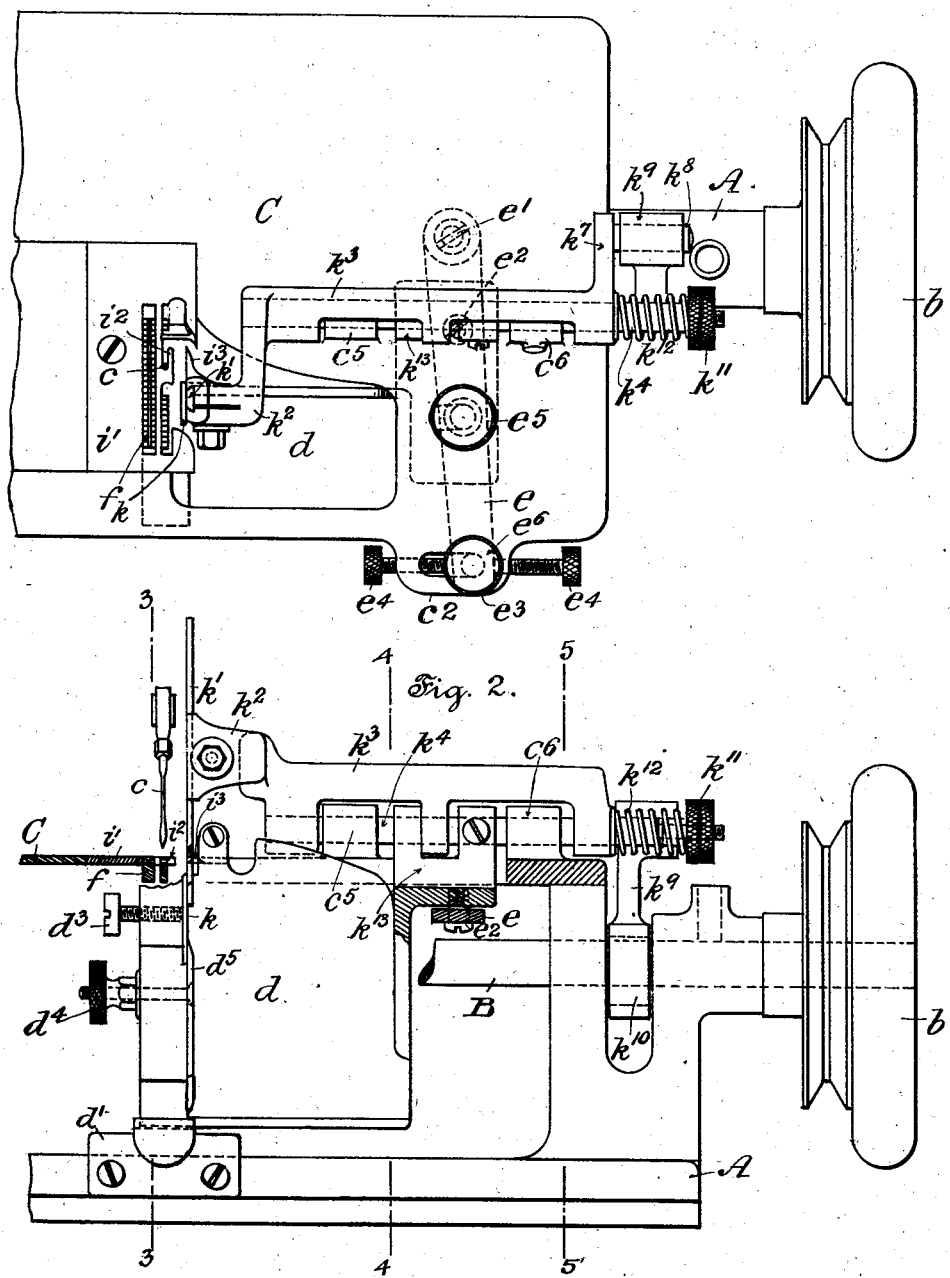

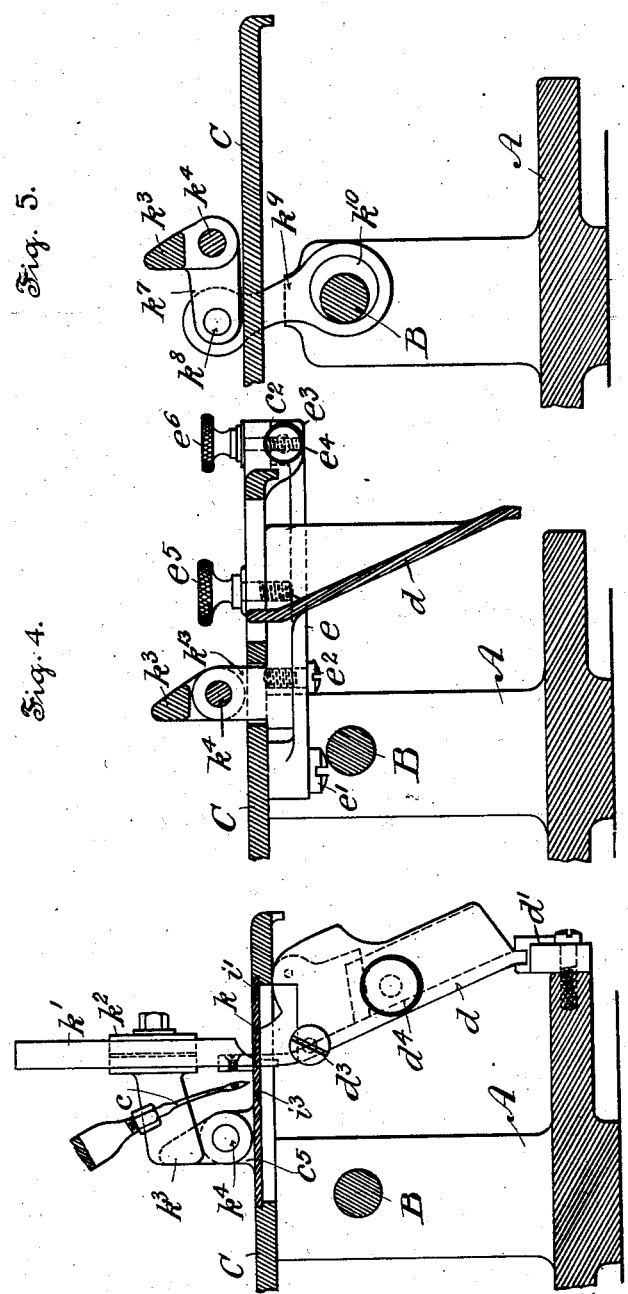

FRANK MALSCH, OF CAMDEN, NEW JERSEY, ASSIGNOR TO THE INDUSTRIAL MANUFACTURING COMPANY, OF CAMDEN, NEW JERSEY.

OVERSEAMING SEWING AND TRIMMING MACHINE.

SPECIFICATION forming part of Letters Patent No. 721,315, dated February 24, 1903.

Application filed March 5, 1901. Serial No. 49,842. (No model.)

*To all whom it may concern:*

Be it known that I, FRANK MALSCH, a citizen of the United States of America, residing at Camden, in the county of Camden and State of New Jersey, have invented new and useful Improvements in Overseaming Sewing and Trimming Machines, of which the following is a specification.

My invention relates to devices by which the width of an overseam or other stitch to be provided on the edges of knit or other fabric may be quickly changed as required; and it consists of a horizontally-sliding chute serving to convey the cut-off material away from the trimmer and having the stationary part of a trimmer and a finger complementing the tongue of the needle-plate over which the stitch is formed attached thereto, a movable part of a trimmer coacting with the said stationary part of the trimmer, and means for moving the said sliding chute with the stationary trimmer part and also the movable trimmer part and the said finger with relation to the stitching-needle or other stitch-forming mechanism.

My new device for changing the width of seams is especially applicable to the sewing-machine shown in United States Patent No. 602,993, but may be used on any other sewing-machine where the trimming of the material is effected by the machine.

The invention will be more fully understood taken in connection with the accompanying drawings, forming part hereof, in which—

Figure 1 is a plan view of a sewing-machine, showing the device for changing the width of the seam and the trimmer in application. Fig. 2 is an elevational view, partly in section, showing the front of the machine with the new devices in application. Fig. 3 is a section on the line 3 3 of Fig. 2. Fig. 4 is a section on the line 4 4 of Fig. 2, and Fig. 5 is a section on the line 5 5 of Fig. 2.

Referring now to the drawings for a further description of my invention, A is the base of the machine; B, the main shaft with pulley $b$. C is the cloth-plate, and $i'$ the needle-plate.

The stitch-forming mechanism comprises a stitching-needle $c$ and a lower hook or hooks (not shown) to form an overseam-stitch—as, for instance, shown in the patent aforesaid.

The device for regulating or fixing on the width of the overseam-stitch comprises a horizontally-sliding chute $d$, held in a guide $d'$ of the base A and by the guide and set screw $e^5$ in the cloth-plate C and a stud-screw $e^2$ in the sliding chute $d$ and passing through the lever $e$ causes the said chute to be moved to the right or left of the machine, according to the direction in which the free end $e^3$ of the lever $e$ is moved by hand or the screws $e^4$ in the lug $c^2$ of the cloth-plate C. These screws $e^4$ after the lever $e$ is set secure the latter in position, while the screw $e^6$ is adapted to clamp the lever $e$ to the cloth-plate C. The guide and set screw $e^5$ is adapted to securely hold the sliding chute $d$ to the cloth-plate C.

The needle-plate $i'$ is provided with the slots for the feed $f$, the apertures for the stitching-needle $c$, and the cast-off tongue $i^2$ for the finished stitch. This cast-off tongue $i^2$ is complemented by the finger $i^3$, secured to and moving with the sliding chute $d$, and as the stitch is formed over this tongue $i^2$ and finger $i^3$, or, in other words, as these two parts determine the width of the stitch, it is apparent that when the finger $i^3$ is moved toward the tongue $i^2$ the stitch becomes smaller and when moved away from the tongue $i^2$ the stitch becomes wider.

With the sliding chute $d$ is connected a trimmer, comprising the blade $k$, secured to the sliding chute $d$, and a movable blade $k'$, forming with the former blade a pair of scissors. The blade $k'$ may be operated in any suitable manner. In the present instance it is clamped to an arm $k^2$ of a bar $k^3$, which is journaled to a rod $k^4$, the latter being held in bearings $c^5$ and $c^6$ and is capable of longitudinal movement in the said bearings. An arm $k^7$ is formed on said bar $k^3$, and a pin $k^8$ receives one end of an eccentric-strap $k^9$, connected with the other end to an eccentric $k^{10}$ on the main shaft B. The right-hand end of the rod $k^4$ is threaded and provided with a thumb-screw $k^{11}$, adapted to force a spring $k^{12}$ against the bar $k^4$ in order to make close contact between the cutting edges of the blades $k$ and $k'$. The rod $k^4$ is secured to a bracket $k^{13}$ of the sliding chute $d$, as shown in Fig. 2, so that when the latter, with the finger $i^3$, is moved in one or the other direction the whole trimmer is moving with the same, the pin $k^8$ allowing such movements with reference to the eccentric-strap $k^9$. The upper blade $k'$ is extended downward and is always with a portion thereof in contact with the lower blade $k$, as shown in Fig. 3, and if for any reason a very close contact between the blades is desired a screw $d^3$ is provided to force the stationary blade $k$ onto the face of the actuating-blade $k'$. The thumb-screw $d^4$ serves to hold the lower blade $k'$ in proper position by means of the plate $d^5$, as shown in Fig. 2. The sliding chute $d$ is so formed as to serve as a chute for the trimmed-off material, which is to be conducted away from the machine.

Having thus described the nature and objects of my invention, what I claim as new, and desire to secure by Letters Patent, is—

1. In a sewing-machine the combination with the stitch-forming mechanism and needle-plate having a tongue over which the stitch is to be formed, of a horizontally-sliding chute, a finger attached to said sliding chute and complementing the said tongue of the needle-plate, a guide for said sliding chute, a lever fulcrumed to the machine and adapted to move the said sliding chute with finger toward or away from the tongue of the needle-plate, substantially as and for the purposes set forth.

2. In a sewing-machine the combination with the stitch-forming mechanism and needle-plate having a tongue over which the stitch is to be formed, of a horizontally-sliding chute, a finger attached to said sliding chute to complement the said tongue of the needle-plate, a stationary trimmer-blade attached to said sliding chute, a movable trimmer-blade coacting with the said trimmer-blade attached to the said sliding chute to trim the goods to be sewed, and means for moving and setting the said sliding chute, substantially as and for the purposes set forth.

3. In a sewing-machine the combination with a main shaft, a cloth-plate, the stitch-forming mechanism and needle-plate having a tongue over which the stitch is to be formed, of a horizontally-sliding chute, a finger attached to said sliding chute to complement the said tongue of the needle-plate, a stationary trimmer-blade attached to said sliding chute, a bar fulcrumed on a rod journaled in bearings of the cloth-plate, an arm on said bar, a movable trimmer-blade detachably connected with the said arm, means for forcing the movable blade against the stationary blade, means for actuating the said movable blade from the main shaft, and means for shifting and setting the said sliding chute and its connected parts with reference to the stitch-forming mechanism to produce a stitch of the desired width, substantially as and for the purposes set forth.

In witness whereof I have hereunto set my hand in the presence of two subscribing witnesses.

FRANK MALSCH.

Witnesses:
MARTIN V. BERGEN,
MARTIN V. BERGEN, Jr.